United States Patent
Na (10) Patent No.: US 11,871,327 B2
(45) Date of Patent: Jan. 9, 2024

(54) TERMINAL DEVICE AND METHOD BY WHICH TERMINAL DEVICE SWITCHES DATA TRANSMISSION PATH

(71) Applicant: SK TELECOM CO., LTD., Seoul (KR)

(72) Inventor: Min Soo Na, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 0 days.

(21) Appl. No.: 16/759,429

(22) PCT Filed: Jan. 12, 2018

(86) PCT No.: PCT/KR2018/000620
§ 371 (c)(1),
(2) Date: Apr. 27, 2020

(87) PCT Pub. No.: WO2019/088364
PCT Pub. Date: May 9, 2019

(65) Prior Publication Data
US 2020/0280901 A1 Sep. 3, 2020

(30) Foreign Application Priority Data
Oct. 30, 2017 (KR) .................. 10-2017-0142365

(51) Int. Cl.
*H04W 40/12* (2009.01)
*H04W 76/15* (2018.01)
(Continued)

(52) U.S. Cl.
CPC .......... *H04W 40/12* (2013.01); *H04W 36/14* (2013.01); *H04W 40/34* (2013.01); *H04W 48/18* (2013.01); *H04W 76/15* (2018.02); *H04W 88/06* (2013.01)

(58) Field of Classification Search
CPC ............................ H04W 40/12; H04W 72/04
See application file for complete search history.

(56) References Cited

U.S. PATENT DOCUMENTS

2007/0064948 A1* 3/2007 Tsirtsis .............. H04W 36/0055
380/270
2007/0260691 A1* 11/2007 Kallqvist ................ H04L 51/58
709/206
(Continued)

FOREIGN PATENT DOCUMENTS

| CN | 106060870 | 10/2016 |
| EP | 2836012 | 2/2015 |

(Continued)

OTHER PUBLICATIONS

International Search Report dated Jul. 30, 2018 issued in Application No. PCT/KR2018/000620.
(Continued)

*Primary Examiner* — Sulaiman Nooristany
(74) *Attorney, Agent, or Firm* — KED & ASSOCIATES, LLP (57) ABSTRACT

The present invention relates to a terminal device and a method by which a terminal device switches a data transmission path, the terminal device being capable of switching a data transmission path by determining by itself whether the data transmission path for transmission of user plane data is switched without a link, among core configurations of respective networks in a mutual interworking environment among heterogeneous networks.

2 Claims, 5 Drawing Sheets (51) Int. Cl.
*H04W 36/14* (2009.01)
*H04W 40/34* (2009.01)
*H04W 48/18* (2009.01)
*H04W 88/06* (2009.01)

(56) References Cited

U.S. PATENT DOCUMENTS

| | | | |
|---|---|---|---|
| 2009/0034469 A1 | 2/2009 | Kim | |
| 2013/0148574 A1 | 6/2013 | Liu et al. | |
| 2013/0328996 A1 | 12/2013 | Rawat et al. | |
| 2016/0066251 A1* | 3/2016 | Sirotkin | H04W 4/025 370/328 |
| 2016/0073287 A1* | 3/2016 | Himayat | H04W 48/18 370/236 |
| 2017/0251401 A1* | 8/2017 | Comstock | H04W 88/06 |
| 2020/0196199 A1* | 6/2020 | Sharma | H04W 36/0016 |

FOREIGN PATENT DOCUMENTS

| | | |
|---|---|---|
| KR | 10-2005-0083508 | 8/2005 |
| KR | 10-1034689 | 5/2011 |
| KR | 10-1087694 | 11/2011 |
| KR | 10-2013-0066544 | 6/2013 |
| KR | 10-1304782 | 9/2013 |
| KR | 10-2015-0008283 | 1/2015 |

OTHER PUBLICATIONS

Korean Office Action dated Oct. 22, 2018 issued in Application No. Oct. 2018-0080799 (English translation attached).
Korean Office Action dated Oct. 22, 2018 issued in Application No. Oct. 2017-0142365 (English translation attached).
Chinese Office Action dated Jan. 6, 2023 issued in Application No. 201880070176.0.
Chinese Office Action dated Aug. 2, 2023 issued in Application No. 201880070176.0.

* cited by examiner

TERMINAL DEVICE AND METHOD BY WHICH TERMINAL DEVICE SWITCHES DATA TRANSMISSION PATH

CROSS-REFERENCE TO RELATED PATENT APPLICATIONS

This application is a U.S. National Stage Application under 35 U.S.C. § 371 of PCT Application No. PCT/KR2018/000620, filed Jan. 12, 2018, which claims priority to Korean Patent Application No. 10-2017-0142365, filed Oct. 30, 2017, whose entire disclosures are hereby incorporated by reference.

TECHNICAL FIELD

The present disclosure relates to a technology in which a terminal apparatus switches a data transmission path by itself in a communication service environment based on an interworking between different types of networks.

BACKGROUND ART

With the development of a mobile communication network for high-speed transmission of high-capacity data, a mobile communication network environment will be developed to support Ultra Reliable and Low Latency Communication (URLLC) service, which can be supported by, for example, a 5th generation mobile communication network (hereinafter, referred to as 5G) environment.

In 5G, a very short data transmission delay (for example, 0.5 ms) may be allowed for providing the URLLC service, and a relatively longer transmission delay of control information (for example, 10 ms) compared to data transmission may be allowed.

Meanwhile, evolution/development to 5G using 4G systems that have been already widely used has been researched recently to increase cost efficiency.

As one of the results of the research, there is a non-standalone technology using a communication service based on an interworking between 4G and 5G networks that are different types of networks.

The non-standalone technology is a scheme for using 4G (LTE) as a primary network to secure seamless coverage and using 5G as a secondary network to transmit and receive data with higher-capability/lower-latency.

In initial access, a terminal apparatus accesses a 4G network, which is a primary network, and accesses a 5G network, which is a secondary network.

A 4G Base Station (BS) which the terminal apparatus accesses to be connected to the 4G network as the primary network, is a master node, and a 5G BS which the terminal apparatus accesses to be connected to the 5G network as which is the secondary network, is a secondary node.

Meanwhile, a technology in which the terminal apparatus accesses all of two or more different BSs (master/secondary) to use a communication service is referred to as a Dual Connectivity (DC) technology.

In connection with this, the terminal apparatus uses the DC technology through which the terminal apparatus accesses both the 4G BS as the master node and the 5G BS as the secondary node in order to use a communication service using 4G as a primary network and 5G as a secondary network.

The DC technology may also support dual connectivity for not only a terminal apparatus operating in a non-standalone mode but also a terminal apparatus operating in a standalone mode in the 5G environment by providing dual connectivity for networks using different frequency bands (for example, 3.5 GHz and 28 GHz).

In this case, a 5G 3.5 GHz BS may be a master node and a 5G 28 GHz BS may be a secondary node, or inversely the 5G 28 GHz BS may be the master node and the 5G 3.5 GHz BS may be the secondary node.

Meanwhile, when the terminal apparatus additionally accesses the secondary node by the DC technology, an access procedure between the terminal apparatus and the secondary node is performed under the control of the master node which the terminal apparatus is accessing.

In the future DC technology between 4G and 5G or the DC technology between different frequency bands within 5G, it is necessary to minimize involvement of the master node for 5G being further evolved/developed.

However, a detailed implementation method thereof has not yet been presented.

Accordingly, the present disclosure proposes a new method of minimizing involvement of the master node in switching of the data transmission path for transmitting user plane data by the terminal apparatus.

DETAILED DESCRIPTION OF THE INVENTION

Technical Problem

The present disclosure has been made to solve the above problems, and an aspect of the present disclosure is to allow a terminal apparatus to switch a data transmission path by itself without any interworking between core configurations of respective networks in a communication service environment based on interworking between different types of networks.

Technical Solution

In accordance with an aspect of the present disclosure, a terminal apparatus is provided. The terminal apparatus includes: an access unit configured to access a first network through access to a first access device and access a second network, which is different from the first network, through access to a second access device, so as to maintain dual connectivity to the first network and the second network; a determination unit configured to determine whether to switch a data transmission path for transmitting user data, based on radio environment information of the first network and radio environment information of the second network; and a switching unit configured to, when it is determined to switch the data transmission path, switch the data transmission path from the first network to the second network so that the user data, which was transmitted through the first network, is transmitted through the second network.

Specifically, the determination unit may be configured to determine to switch the data transmission path when expected throughput of the second network according to the radio environment information of the second network is higher than expected throughput of the first network according to the radio environment information of the first network.

Specifically, the expected throughput of the first network and the expected throughput of the second network may be identified from a mapping table in which the expected throughput is mapped to the radio environment information for each of the first network and the second network.

Specifically, the determination unit may be configured to determine whether to switch the data transmission path according to a preset period, and when a difference between expected throughput of the first network and expected throughput of the second network in a specific period is higher than or equal to a threshold value, determine to switch the data transmission path.

Specifically, the switching unit may switch the data transmission path from the first network to the second network by transmitting a packet making a request for activating the second network.

In accordance with another aspect of the present disclosure, a method of switching a data transmission path by a terminal apparatus is provided. The method includes: an access step of accessing a first network through access to a first access device and accessing a second network, which is different from the first network, through access to a second access device, so as to maintain dual connectivity to the first network and the second network; a determination step of determining whether to switch a data transmission path for transmitting user data, based on radio environment information of the first network and radio environment information of the second network; and a switching step of, when it is determined to switch the data transmission path, switching the data transmission path from the first network to the second network so that the user data, which was transmitted through the first network, is transmitted through the second network.

Specifically, the determination step may include determining to switch the data transmission path when expected throughput of the second network according to the radio environment information of the second network is higher than expected throughput of the first network according to the radio environment information of the first network.

Specifically, the expected throughput of the first network and the expected throughput of the second network may be identified from a mapping table in which the expected throughput is mapped to the radio environment information for each of the first network and the second network.

Specifically, the determination step may include determining whether to switch the data transmission path according to a preset period, and when a difference between expected throughput of the first network and expected throughput of the second network in a specific period is higher than or equal to a threshold value, determining to switch the data transmission path.

Specifically, the switching step may include switching the data transmission path from the first network to the second network by transmitting a packet making a request for activating the second network.

Advantageous Effects

According to a terminal apparatus and a method of switching a data transmission path by a terminal apparatus of the present disclosure, it is possible to minimize involvement of a master node by the terminal apparatus being able to determine whether to switch the data transmission path for transmitting user plane data and switch a data transmission path by itself in a communication service environment based on interworking between different types of networks.

MODE FOR CARRYING OUT THE INVENTION

Hereinafter, an embodiment of the present disclosure will be described with reference to the accompanying drawings.

Figure 1:
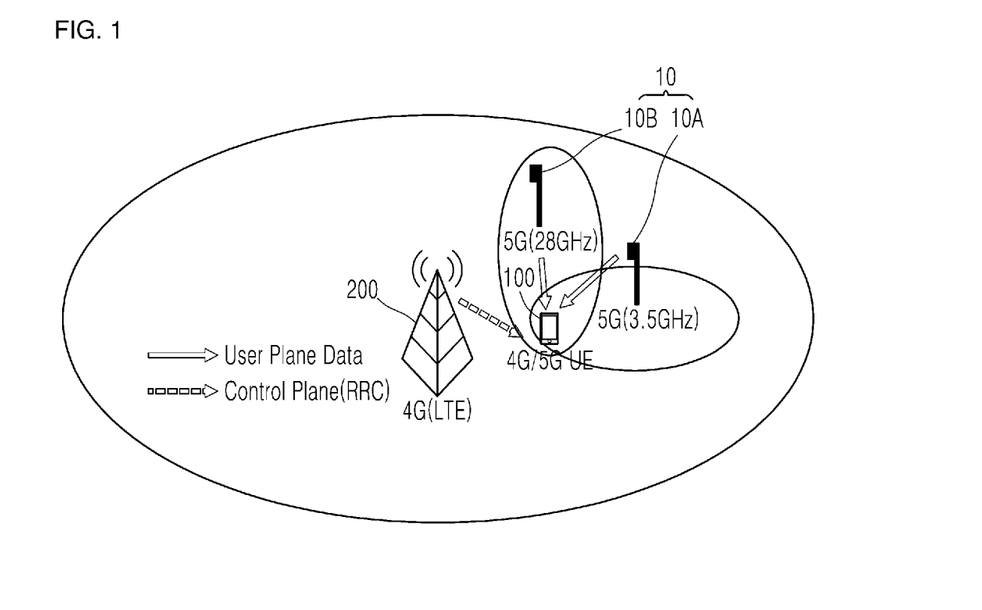
FIG. 1 illustrates a communication environment according to an embodiment of the present disclosure.

FIG. 1 illustrates a communication environment in which a terminal apparatus operates according to an embodiment of the present disclosure.

An embodiment of the present disclosure describes a Dual Connectivity (DC) technology as a technology through which the terminal apparatus accesses all Base Stations (BSs) (master/secondary) of respective networks on the basis of a mutual link between different types of networks to use a communication service.

As illustrated in FIG. 1, a communication environment to which an embodiment of the present disclosure is applied is limited to a communication environment in which different types of networks, for example, radio section access devices of 4G and 5G coexist.

Hereinafter, a BS 200 illustrated in FIG. 1 is referred to as a 4G BS, which is an access device supporting radio section access of a 4G network, and a BS 10 illustrated in FIG. 1 is referred to as a 5G BS, which is an access device supporting radio section access of a 5G network.

Particularly, the 5G BS may be divided into a 5G 3.5 GHz BS 10A and a 5G 28 GHz BS 10B included in respective networks on the basis of a frequency band provided in a 5G environment.

Of course, the present disclosure is not limited thereto but may include BSs based on various frequency bands according to a frequency band provided in the 5G environment.

5G aims at an Ultra Reliable and Low Latency Communication (URLLC) service based on near real time data transmission/reception.

To this end, 5G allows a very short data transmission (transmission and reception) delay (for example, 0.5 ms) and the allowance of a relatively longer control information transmission (transmission and reception) delay (for example, 10 ms) compared to data is being discussed.

Meanwhile, research on the evolution/development to 5G using 4G systems that have been already widely used while also increasing cost efficiency has started recently.

As one of the results of the research, there is a non-standalone technology using a communication service based on a mutual link between 4G and 5G networks that are different types of networks.

The non-standalone technology is a scheme for securing seamless coverage using 4G (LTE) as a primary network and transmitting and receiving higher-capability/lower-latency data using 5G as a secondary network.

That is, the non-standalone technology is a technology using a communication service based on a mutual link between 4G and 5G networks.

In connection with this, a terminal apparatus 100 according to an embodiment of the present disclosure supports the non-standalone technology.

In initial access to a network, the terminal apparatus 100 accesses a 4G network, which is a primary network, and additionally accesses a 5G network, which is a secondary network, according to the non-standalone technology.

A 4G Base Station (BS) which the terminal apparatus 100 accesses to be connected to the 4G network, which is the primary network, is a master node, and a 5G BS which the terminal apparatus 100 accesses to be connected to the 5G network, which is the secondary network, is a secondary node.

The terminal apparatus 100 may access the 4G BS 200, which is the master node, and access all 5G BSs 10, which are the secondary nodes, in order to use a communication service using 4G as the primary network and 5G as the secondary network according to the application of the DC technology.

The access to all 5G BSs 10 may mean access to all of the 5G 3.5 GHz BS 10A and the 5G 28 GHz BS 10B.

Further, the terminal apparatus 100 according to an embodiment of the present disclosure may also support a standalone technology in the 5G environment.

Accordingly, when the terminal apparatus 100 operates in a standalone mode, according to the DC technology, the terminal apparatus 100 may access the 5G 3.5 GHz BS 10A as the master node and the 5G 28 GHz BS 10B as the secondary node, or inversely may access the 5G 28 GHz BS 10B as the master node and the 5G 3.5 GHz BS 10A as the secondary node.

In the current DC technology, processing of additionally accessing/releasing/access switching of the secondary node of the terminal apparatus 100 may be performed under the control of the master node.

That is, it is defined that the secondary node of the terminal apparatus 100 is managed by the master node.

However, in consideration of an environment in which 5G is further evolved/developed in the future, the DC technology between 4G and 5G or the DC technology between different frequency bands within 5G needs to minimize the control of the master node in processing of additional accessing/releasing/access switching of the secondary node of the terminal apparatus 100.

An embodiment of the present disclosure newly proposes an implementation method of minimizing the control of the master node in the use of the DC technology.

Specifically, an embodiment of the present disclosure proposes a method by which the terminal apparatus 100 switches a data transmission path for transmitting user plane data by itself to minimize the control of the master node, and a configuration of the terminal apparatus 100 for implementing the same will be described below in detail.

Figure 2:
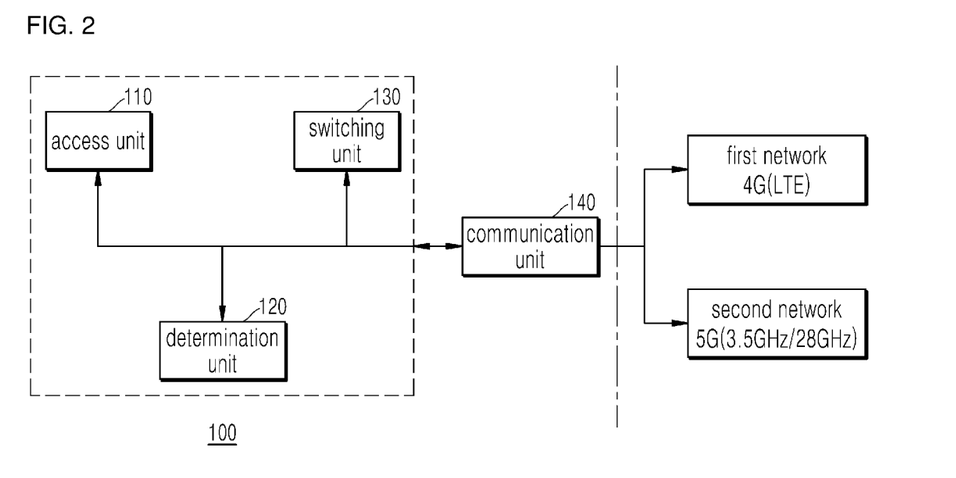
FIG. 2 is a block diagram illustrating a terminal apparatus according to an embodiment of the present disclosure.

FIG. 2 schematically illustrates a configuration of the terminal apparatus 100 according to an embodiment of the present disclosure.

As illustrated in FIG. 2, the terminal apparatus 100 according to an embodiment of the present disclosure includes an access unit 110, a determination unit 120, and a switching unit 130.

All or at least some of the elements of the terminal apparatus 100 may be implemented in the form of a hardware module, a software module, or a combination of a hardware module and a software module.

The software module may be understood as, for example, an instruction executed by a processor for processing calculations within the terminal apparatus 100, and the instruction may be installed in a separate memory within the terminal apparatus 100.

Meanwhile, the terminal apparatus 100 according to an embodiment of the present disclosure may further include a communication unit 140, which is an RF module for performing an actual communication function with another network device (for example, a BS) as well as the above-described elements.

The communication unit 140 may include, for example, an antenna system, an RF transceiver, one or more amplifiers, a tuner, one or more oscillators, a digital signal processor, a CODEC chipset, and a memory, but is not limited thereto, and may include all known circuits for performing the function.

As a result, the terminal apparatus 100 according to an embodiment of the present disclosure may switch a data transmission path for transmitting user plane data by itself on the basis of the above-described elements.

Hereinafter, each element within the terminal apparatus 100 for implementing the same will be described in detail.

The access unit 110 performs a function of processing dual connectivity.

More specifically, the access unit 110 accesses a first network through access to a first access device and accesses a second network, which is different from the first network, through access to a second access device according to a non-standalone operation.

It has been described that the terminal apparatus 100 according to an embodiment of the present disclosure initially accesses the 4G BS 200 as the master node and then accesses the 5G BS 10 as the secondary node in the non-standalone operation.

Accordingly, the first network is the 4G network, the first access device is the 4G BS 200, the second network is the 5G network, and the second access device is the 5G BS 10.

Hereinafter, for convenience of description, the first network and the first access device are mentioned as the 4G network and the 4G BS 200, respectively, and the second network and the second access device are mentioned as the 5G network and the 5G BS 10, respectively.

That is, the access unit 110 initially accesses the 4G network through access to the 4G BS 200 and additionally accesses the 5G network through access to the 5G BS 10 according to the non-standalone operation, thereby maintaining the dual connectivity to the 4G network and the 5G network.

The 5G BS 10 includes both the 5G 3.5 GHz BS 10A and the 5G 28 GHz BS 10B.

Figure 3:
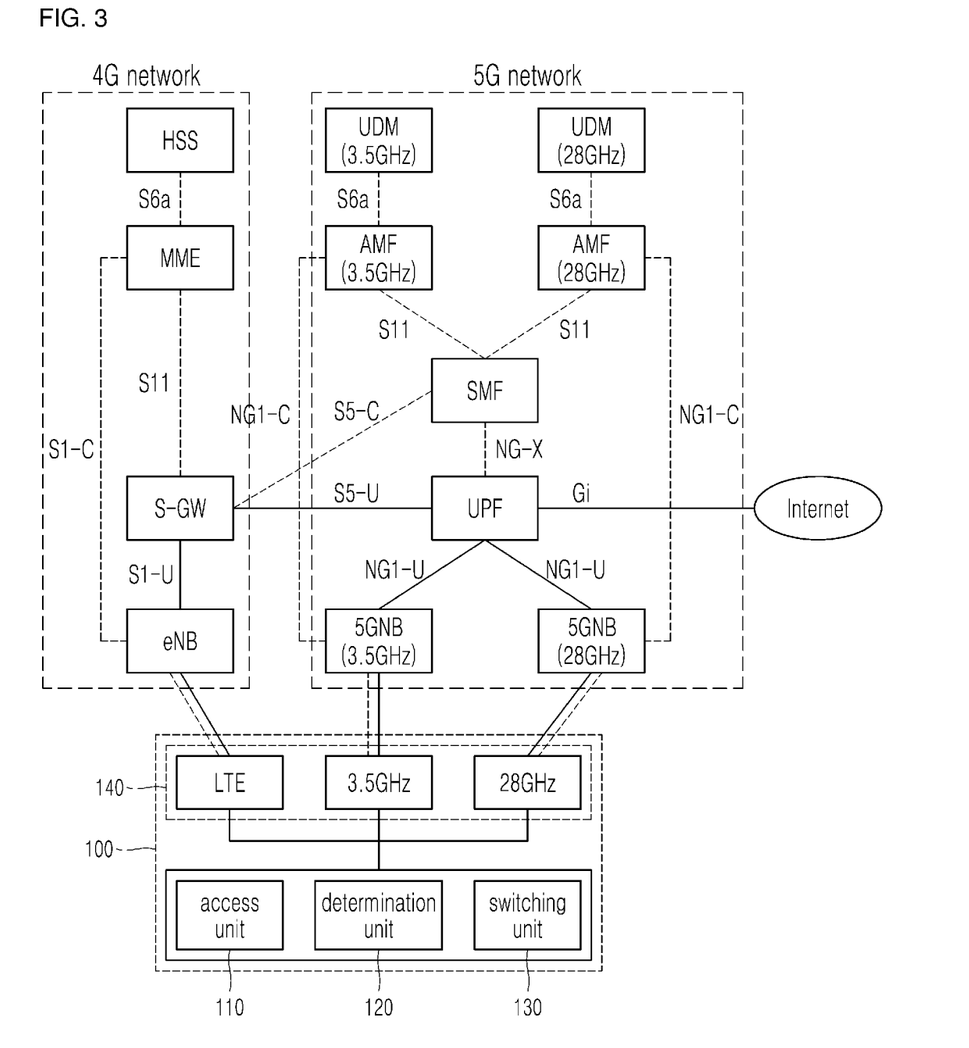
FIG. 3 is a block diagram illustrating networks based on a communication environment according to an embodiment of the present disclosure.

For reference, a communication environment for supporting the dual connectivity operation according to an embodiment of the present disclosure may follow a network configuration as illustrated in FIG. 3.

In connection with this, the terminal apparatus 100 according to an embodiment of the present disclosure includes an RF module for supporting each of the 4G network (LTE) and the 5G network (3.5 GHz and 28 GHz) in the communication unit 140 and thus processes the dual connectivity operation for initially accessing the 4G network and additionally accessing the 5G network.

Of course, when the terminal apparatus 100 operates in the standalone mode in the 5G environment, the terminal apparatus 100 may process the dual connectivity operation of accessing the 5G 3.5 GHz BS 10A as the master node and the 5G 28 GHz BS 10B as the secondary node, or inversely may access the 5G 28 GHz BS 10B as the master node and the 5G 3.5 GHz BS 10A as the secondary node.

Hereinafter, for convenience of description, the dual connectivity operation for initially accessing the 4G network through access to the 4G BS 200 and additionally accessing the 5G network through access to the 5G BS 10 will be described by way of example.

Figure 4:
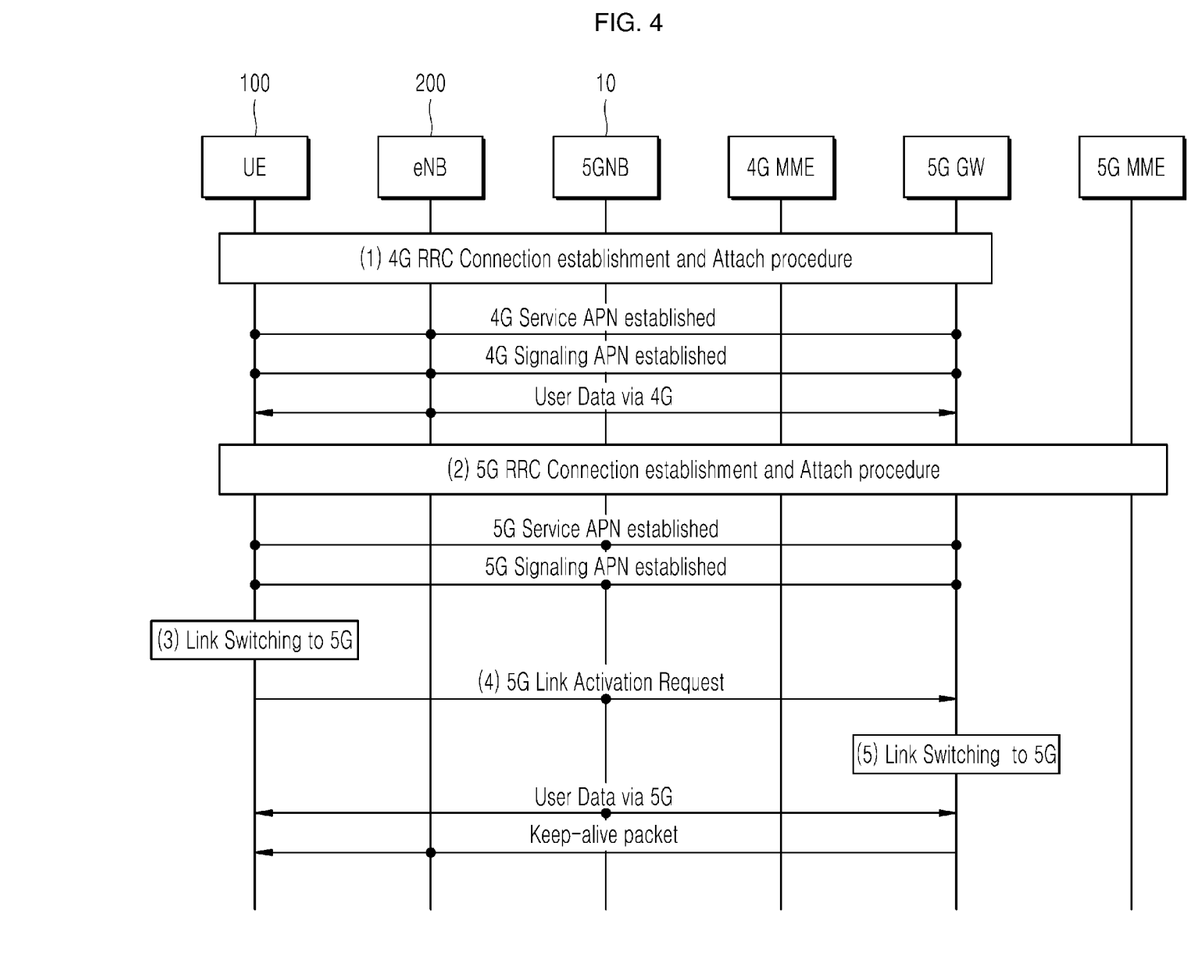
FIG. 4 illustrates a call processing procedure according to an embodiment of the present disclosure.

The dual connectivity operation is defined through a call processing procedure as illustrated in FIG. 4.

That is, as illustrated in FIG. 4, in initial access to the 4G network, a 4G signaling APN is generated through a 4G RRC Connection establishment and Attach procedure (1).

At this time, when Mobile Termination (MT) or Mobile Origination (MO) is generated, the terminal apparatus 100 processes access to the 4G network by performing RRC connection setup through the 4G network.

As described above, when the access to the 4G network is completely processed, a data transmission path through which the terminal apparatus 100 transmits user plane data may be set as the 4G network.

Thereafter, through a 5G RRC Connection establishment and Attach procedure (2), a 5G signaling APN may be generated and RRC connection setup may be performed through the network, and thus additional access to the 5G network may be completed.

For reference, a 5G GW in the configuration of FIG. 4 may be understood as a configuration including at least some of a User Plane Function (UPF) serving to perform a user plane function and a Session Management Function (SMF) serving to perform a session management function in the 5G network of FIG. 3.

A 5G MME may be understood as a core configuration of the 5G network including an Access and Mobility Function (AMF) serving to perform a mobility management function in FIG. 3.

The determination unit 120 determines whether to switch the data transmission path for transmitting user plane data.

More specifically, the determination unit 120 determines whether to switch the data transmission path for transmitting the user plane data on the basis of radio environment information of the 4G network and radio environment information of the 5G network in the state in which the dual connectivity to the 4G network and the 5G network is maintained.

The radio environment information according to an embodiment of the present disclosure is information identified for each of the 4G network and the 5G network belonging to the dual connectivity.

The radio environment information may include, for example, transmission intensity information (RSTP), a Signal-to-Noise Ratio (SINR), and downlink bandwidth information (effective DL BW).

Of course, the radio environment information is not limited to the above-example, but may include all pieces of information for identifying a network state of each of the 4G network and the 5G network belonging to the dual connectivity.

At this time, the determination unit 120 identifies each of expected throughput of the 4G network according to radio environment information of the 4G network and expected throughput of the 5G network according to radio environment information of the 5G network.

When the expected throughput of the 5G network is higher than the expected throughput of the 4G network, which corresponds to the current data transmission path, the determination unit 120 may determine to switch the data transmission path for transmitting user plane data from the current 4G network to the 5G network.

The expected throughput of the 4G network and the expected throughput of the 5G network are identified from a mapping table in which the expected throughput is mapped to the radio environment information for each of the 4G network and the 5G network.

The expected throughput mapped to each piece of the radio environment information in the mapping table may be mapped in the form of a value obtained by averaging, for example, current (current period) radio environment information and past (previous periods) radio environment information.

The averaging of the radio environment information may be processed through, for example, a scheme using a digital filter including an Infinite Impulse Response (IIR) filter.

Meanwhile, the determination unit 120 determines whether to switch the data transmission path according to a preset period.

At this time, according to an embodiment of the present disclosure, a hysteresis margin is applied to prevent a frequent switching operation (PING PONG) of the data transmission path.

That is, the data transmission path is switched only when a difference between expected throughput of the 4G network and expected throughput of the 5G network identified in a specific period is larger than or equal to a threshold value.

For reference, the determination about whether to switch the data transmission path corresponds to a procedure of Link Switching to 5G (3) in the call processing process described above with reference to FIG. 4.

The switching unit 130 performs a function of switching the data transmission path.

More specifically, when it is determined to switch the data transmission path, the switching unit 130 may switch the data transmission path from the 4G network to the 5G network, and thus allow user plane data that was transmitted through the 4G network to be transmitted through the 5G network.

At this time, the switching unit 130 transmits a packet making a request for activating the 5G network to the 5G network, thereby switching the data transmission path from the 4G network to the 5G network.

Such a switching process may be described through the call processing procedure described above with reference to FIG. 4.

As illustrated in FIG. 4, when it is determined to switch the data transmission path through the procedure of Link Switching to 5G (3), the packet making a request for activating the 5G network is transmitted to a 5G GW located in the 5G network through a procedure of 5G Link Activation Request (4).

The 5G GW may switch the data transmission path conventionally set as the 4G network to the 5G network, so that the user plane data can be transmitted through the 5G network.

Here, a noteworthy feature is that whether to switch the data transmission path is directly determined by the terminal apparatus 100.

Accordingly, during the process of switching the data transmission path, there is no need to link a 4G MME corresponding to a core configuration of the 4G network and a 5G MME corresponding to a core configuration of the 5G network.

As a result, according to an embodiment of the present disclosure, involvement of the 4G network corresponding to the master node in the DC technology can be minimized.

Hereinafter, a method of switching the data transmission path by the terminal apparatus 100 according to an embodiment of the present disclosure will be described with reference to FIG. 5.

Figure 5:
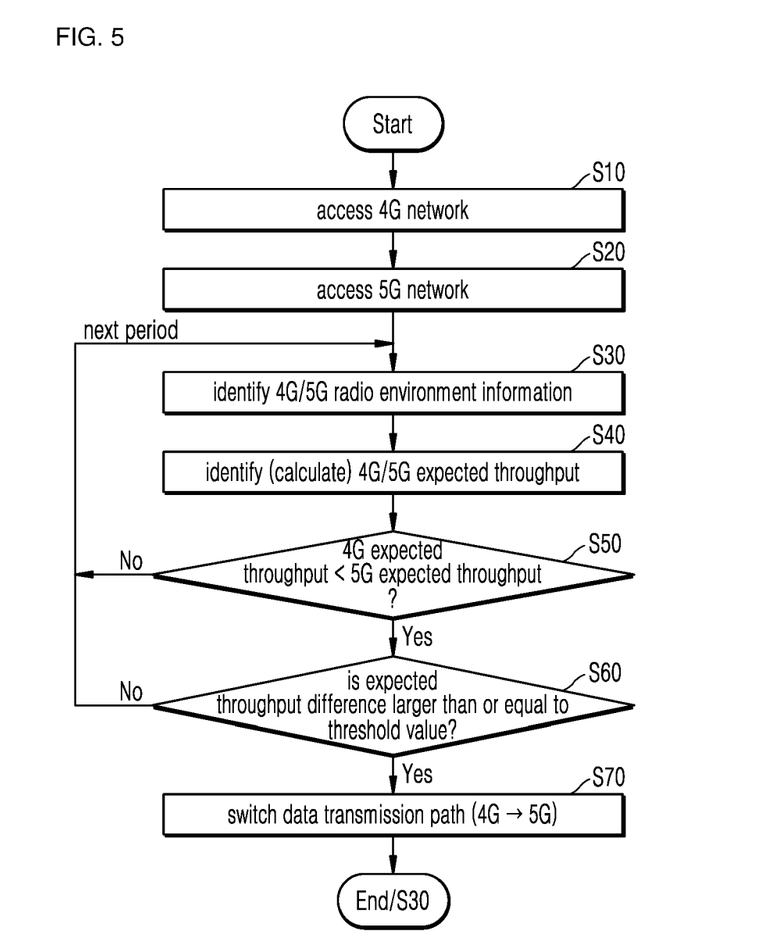
FIG. 5 is a flowchart illustrating a method of switching a data transmission path by a terminal apparatus according to an embodiment of the present disclosure.

FIG. 5 is a flowchart schematically illustrating a method of switching a data transmission path by the terminal apparatus 100 according to an embodiment of the present disclosure.

First, the access unit 110 initially accesses the 4G network through access to the 4G BS 200 and additionally accesses the 5G network through access to the 5G BS 10 according to the non-standalone operation, thereby maintaining the dual connectivity to the 4G network and the 5G network in S10 and S20.

Such a dual connectivity operation may be defined through the call processing procedure described above with reference to FIG. 4.

That is, as illustrated in FIG. 4, in initial access to the 4G network, a 4G signaling APN is generated through a 4G RRC Connection establishment and Attach procedure (1).

At this time, when Mobile Termination (MT) or Mobile Origination (MO) is generated, the terminal apparatus 100 processes access to the 4G network by performing RRC connection setup through the 4G network.

As described above, when the access to the 4G network is completely processed, the data transmission path for transmitting user plane data by the terminal apparatus 100 may be set as the 4G network.

Thereafter, through a 5G RRC Connection establishment and Attach procedure (2), a 5G signaling APN is generated and RRC connection setup is performed through the network, and thus additional access to the 5G network is completed.

For reference, a 5G GW in the configuration of FIG. 4 may be understood as a configuration including at least some of a User Plane Function (UPF) and a Session Management Function (SMF) in the 5G network of FIG. 3.

A 5G MME may be understood as a core configuration of the 5G network including an Access and Mobility Function (AMF) serving to perform a mobility management function in FIG. 3.

Subsequently, the determination unit 120 determines whether to switch the data transmission path for transmitting the user plane data on the basis of radio environment information of the 4G network and radio environment information of the 5G network in the state in which the dual connectivity to the 4G network and the 5G network is maintained in S30 to S60.

The radio environment information according to an embodiment of the present disclosure is information identified for each of the 4G network and the 5G network belonging to the dual connectivity.

The radio environment information may include, for example, transmission intensity information (RSTP), a Signal-to-Noise Ratio (SINR), and downlink bandwidth information (effective DL BW).

Of course, the radio environment information is not limited to the above-example, but may include all pieces of information for identifying a network state of each of the 4G network and the 5G network.

At this time, the determination unit 120 identifies each of expected throughput of the 4G network according to radio environment information of the 4G network and expected throughput of the 5G network according to radio environment information of the 5G network.

When the expected throughput of the 5G network is higher than the expected throughput of the 4G network, which corresponds to the current data transmission path, the determination unit 120 may determine to switch the data transmission path for transmitting user plane data from the current 4G network to the 5G network.

The expected throughput of the first network and the expected throughput of the second network may be identified from a mapping table in which the expected throughput is mapped to the radio environment information for each of the 4G network and the 5G network.

The expected throughput mapped to each piece of the radio environment information in the mapping table may be mapped in the form of a value obtained by averaging, for example, current radio environment information and past radio environment information.

The averaging of the radio environment information may be processed through, for example, a scheme using a digital filter including an Infinite Impulse Response (IIR) filter.

Meanwhile, the determination unit 120 determines whether to switch the data transmission path according to a preset period.

At this time, according to an embodiment of the present disclosure, a hysteresis margin is applied to prevent a frequent switching operation (PING PONG) of the data transmission path.

That is, the data transmission path is switched only when a difference between expected throughput of the 4G network and expected throughput of the 5G network identified in a specific period is larger than or equal to a threshold value.

For reference, the determination about whether to switch the data transmission path corresponds to a procedure of Link Switching to 5G (3) in the call processing process described with reference to FIG. 4.

Thereafter, when it is determined to switch the data transmission path, the switching unit 130 switches the data transmission path from the 4G network to the 5G network so that the user plane data, which was transmitted through the 4G network, can be transmitted through the 5G network in S70.

At this time, the switching unit 130 transmits a packet making a request for activating the 5G network to the 5G network, thereby switching the data transmission path from the 4G network to the 5G network.

Such a switching process may be described through the call processing procedure described above with reference to FIG. 4.

As illustrated in FIG. 4, when it is determined to switch the data transmission path through the procedure of Link Switching to 5G (3), the packet making a request for activating the 5G network is transmitted to a 5G GW located in the 5G network through a procedure of 5G Link Activation Request (4).

The 5G GW may switch the data transmission path conventionally set as the 4G network to the 5G network, so that the user plane data can be transmitted through the 5G network.

As described above, according to a method of switching a data transmission path by the terminal apparatus 100 according to an embodiment of the present disclosure, whether to switch the data transmission path for transmitting user plane data may be directly determined by identifying expected throughput of each of the 4G network and the 5G network on the basis of radio environment information of each of the 4G network and the 5G network belonging to dual connectivity.

Accordingly, during a process of switching the data transmission path, the terminal apparatus 100 may switch the data transmission path without any link between a 4G MME corresponding to a core configuration of the 4G network and a 5G MME corresponding to a core configuration of the 5G network, thereby minimizing involvement of the 4G network corresponding to a master node in DC technology.

Meanwhile, the method of switching the data transmission path according to an embodiment of the present disclosure may be implemented in the form of a program instruction that can be executed through various computer means and recorded in a computer-readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

The invention claimed is:

1. A terminal apparatus including a processor and a memory within the terminal apparatus comprising:
   an access unit configured to access a first network through access to a first access device and access a second network, which is different from the first network, through access to a second access device, so as to maintain dual connectivity to the first network and the second network;
   a determination unit configured to:
   average current radio environment information and past radio environment information for the first network to calculate first radio environment information, and average current radio environment information and past radio environment information for the second network to calculate second radio environment information, the first radio environment information and the second radio environment information including at least one of transmission intensity information, a signal-to-noise ratio, or downlink bandwidth information for, respectively, the first network and the second network, and determine whether to switch a data transmission path for transmitting user data, based on the first radio environment information of the first network and the second radio environment information of the second network; and
   a switching unit configured to, based on determining to switch the data transmission path, switch the data transmission path from the first network to the second network so that the user data, which is to be transmitted through the first network, is transmitted through the second network,
   wherein the switching unit is configured to switch the data transmission path from the first network to the second network without a link between a core configuration of the first network and a core configuration of the second network by transmitting a packet making a request for activating the second network to the second network and without transmitting the packet to the first network;
   wherein the first network is fourth-generation 4G) wireless network, and the second network is a fifth-generation (5G) wireless network;
   wherein the determination unit is further configured to: estimate a first expected throughput of the first network according to the first radio environment information of the first network and a second expected throughput of the second network according to the second radio environment information of the second network;
   determine to switch the data transmission path from the first network to the second network when the second expected throughput of the second network is greater than the first expected throughput of the first network,
   wherein the first expected throughput of the first network and the second expected throughput of the second network are identified from mapping data that maps the first expected throughput to the first radio environment information of the first network and the second expected throughput to the second radio environment information of the second network; and
   wherein the determination unit is configured to: after the estimated of the first expected throughput of the first network according to the first radio environment information of the first network and the second expected throughput of the second network according to the second radio environment information of the second network, the determination unit is further configured to: determine to switch the data transmission path from the first network to the second network when a difference between the first expected throughput of the first network and the second expected throughput of the second network is greater than or equal to a threshold value.

2. A method of switching a data transmission path by a terminal apparatus, the method comprising:
   accessing a first network through access to a first access device and accessing a second network, which is different from the first network, through access to a second access device, so as to maintain dual connectivity to the first network and the second network;
   averaging radio environment information for the first network from a current time period and from at least one prior time period and calculating a first expected throughput for the first network based on the averaged radio environment information for the first network;
   averaging radio environment information for the second network from the current time period and from the at least one prior time period and calculating a second expected throughput for the second network based on the averaged radio environment information for the second network;
   wherein the radio environment information for the first network includes at least one of transmission intensity information, a signal-to-noise ratio, or downlink bandwidth information for the first network, and the radio environment information for the second network includes at least one of transmission intensity information, a signal-to-noise ratio, or downlink bandwidth information for the second network;

determining to switch the data transmission path for transmitting user data from the first network to the second network when the first expected throughput of the first network is less than the second expected throughput of the second network; and switching, based on determining to switch the data transmission path, the data transmission path from the first network to the second network so that the user data, which is to be transmitted through the first network, is transmitted through the second network, wherein switching the data transmission path from the first network to the second network includes switching the data transmission path from the first network to the second network without a link between a core configuration of the first network and a core configuration of the second network by transmitting a packet making a request for activating the second network to the second network and without transmitting the packet to the first network, wherein the first network is fourth-generation 4G) wireless network, and the second network is a fifth-generation (5G) wireless network;

wherein the first expected throughput of the first network and the second expected throughput of the second network are identified from mapping data in which the first expected throughput is mapped to the averaged radio environment information of the first network and the second expected throughput is mapped to the averaged radio environment information of the second network; and wherein determining whether to switch the data transmission path from the first network to the second network includes: determining to switch the data transmission path when a difference between the first expected throughput of the first network and the second expected throughput of the second network is greater than or equal to a threshold value.

* * * * *